United States Patent [19]

Denis

[11] 4,195,702
[45] Apr. 1, 1980

[54] WHEEL KIT FOR SNOWMOBILE

[76] Inventor: Michel Denis, 3241 Doverthorn Rd., SE., Calgary, Alberta T2B 2G9 Canada

[21] Appl. No.: 930,027

[22] Filed: Aug. 1, 1978

[51] Int. Cl.² .................. B62M 27/00; B62D 55/04
[52] U.S. Cl. .................................... 180/183; 180/215
[58] Field of Search ............ 180/5 R, 5 A, 6 R, 6 A, 180/25 R, 25 A, 27; 280/7.1, 7.12, 7.14

[56] References Cited

U.S. PATENT DOCUMENTS

| | | | |
|---|---|---|---|
| 2,586,273 | 2/1952 | Steven | 180/27 |
| 3,435,907 | 4/1969 | Imhoff | 180/5 R |
| 3,521,717 | 7/1970 | Coons | 180/25 R |
| 4,082,155 | 4/1978 | McCartney | 180/5 R |

FOREIGN PATENT DOCUMENTS 982197  1/1976  Canada .................................. 180/5 R Primary Examiner—Joseph F. Peters, Jr.
Assistant Examiner—Randall A. Schrecengost

[57] ABSTRACT

A wheel kit is disclosed for converting snowmobiles into wheeled vehicles. The kit is mounted on the chassis of a snowmobile after removal of the front skis and endless track. The conversion device comprises a front wheel drive assembly including a frame secured to the front end of the chassis of the snowmobile and a pair of laterally spaced wheels rotatably mounted on the frame and powered by the snowmobile engine, and a rear wheel steering assembly including a frame secured to the rear end of the snowmobile chassis, a single wheel pivotally mounted on the rear frame and steering means interconnecting the rear wheel to the regular steering mechanism of the snowmobile.

3 Claims, 5 Drawing Figures

WHEEL KIT FOR SNOWMOBILE

This invention relates to a wheel kit which allows conversion of snowmobiles into wheeled vehicles.

BACKGROUND OF THE INVENTION

Many conversion kits have been designed for converting snowmobiles into various kinds of wheeled vehicles. One example of such kit is the one disclosed in Canadian Pat. No. 982,197 issued June 20, 1976. However, most of these kits have four wheels and are generally too elaborate for the ordinary individual to install. They are also fairly expensive.

STATEMENT OF THE INVENTION

It is therefore the object of the present invention to provide a non-costly kit which will permit an easy and simple conversion of a snowmobile into a wheeled vehicle.

The conversion device, in accordance with the invention, is mounted on the chassis of a snowmobile after removal of the front skis and endless track. The conversion device comprises a front wheel drive assembly including a frame adapted to be secured to the front end of the snowmobile chassis and a pair of laterally spaced wheels rotatably mounted on such frame and powered by the snowmobile engine, and a rear wheel steering assembly including a frame also adapted to be secured to the rear end of the snowmobile chassis, a single wheel pivotally mounted on the rear frame and steering means interconnecting the rear wheel to the regular steering mechanism of the snowmobile.

The front wheel drive assembly preferably comprises a pair of bearings secured to the frame, a drive shaft coupled to the front wheels and journalled in such bearings, and drive means connecting the shaft to the snowmobile engine.

The rear wheel steering assembly preferably comprises a steering shaft rotatably mounted on the rear frame, an inverted U-shaped member having its central portion secured to the steering shaft and its legs extending downwardly one on each side of the wheel and each forming one sloping leg of an A-shaped suspension mechanism which further comprises a spring biased suspension device extending downwardly from the central portion of the U-shaped member and forming the other sloping leg of the A-shaped suspension mechanism and a transverse member connecting the end of each leg of the U-shaped member to the lower end of the spring biased suspension device. The axle of the rear wheel is pivotally mounted on the transverse member at the intersection of such transverse member with the lower end of the spring biased suspension device.

The steering means preferably includes a rod interconnecting each leg of the U-shaped member to the respective arm of the snowmobile steering mechanism.

SHORT DESCRIPTION OF THE DRAWINGS

The invention will now be disclosed, by way of example, with the reference to the accompanying drawings in which.

DETAILED DESCRIPTION OF A PREFERRED EMBODIMENT

Figure 1:
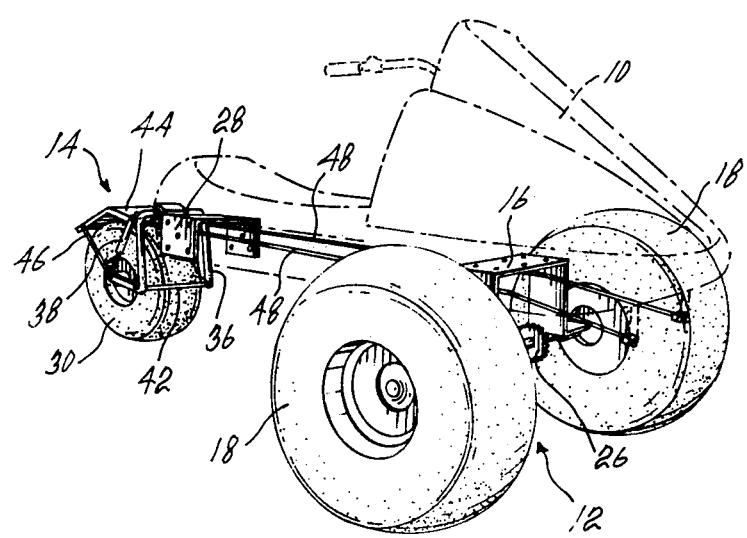
FIG. 1 is a perspective view of the conversion device in accordance with the invention.
Figure 2:
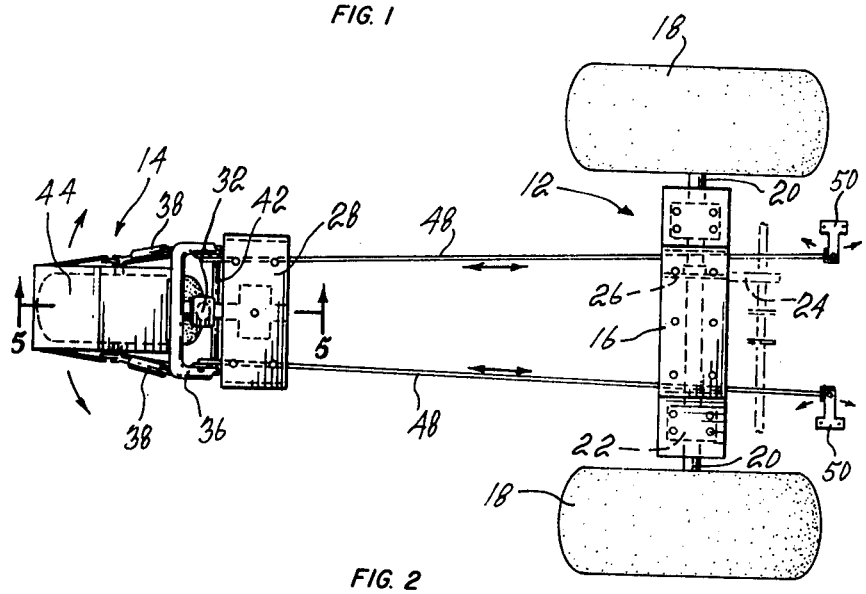
FIG. 2 is a top plan view of the conversion device in accordance with the invention.
Figure 3:
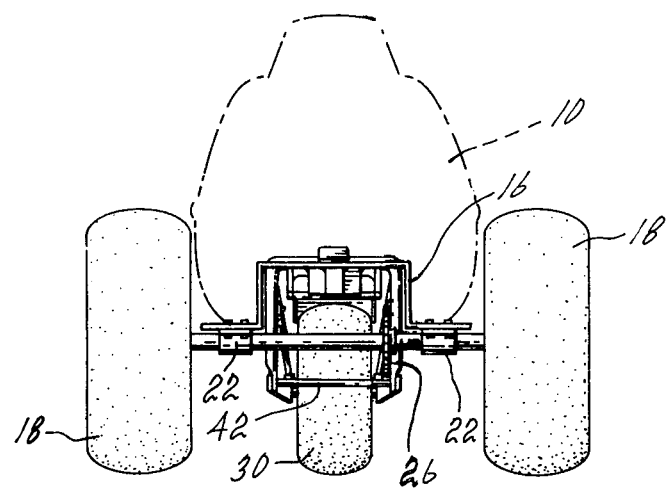
FIG. 3 is a rear view of the conversion device in accordance with the invention.
Figure 5:
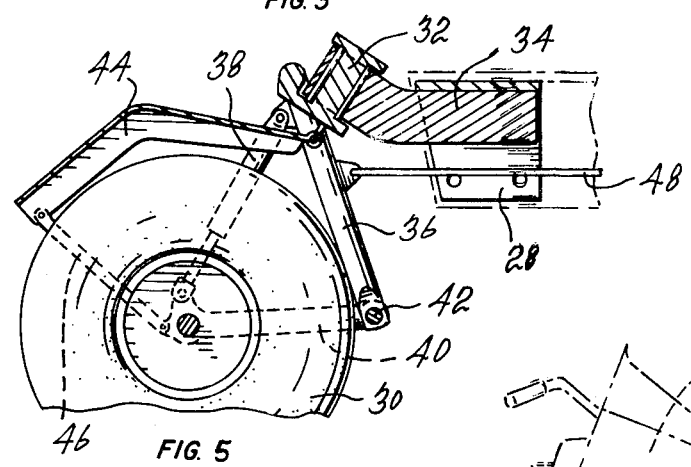
FIG. 5 is a section view taken along line 5—5 of FIG. 2.
Figure 4:
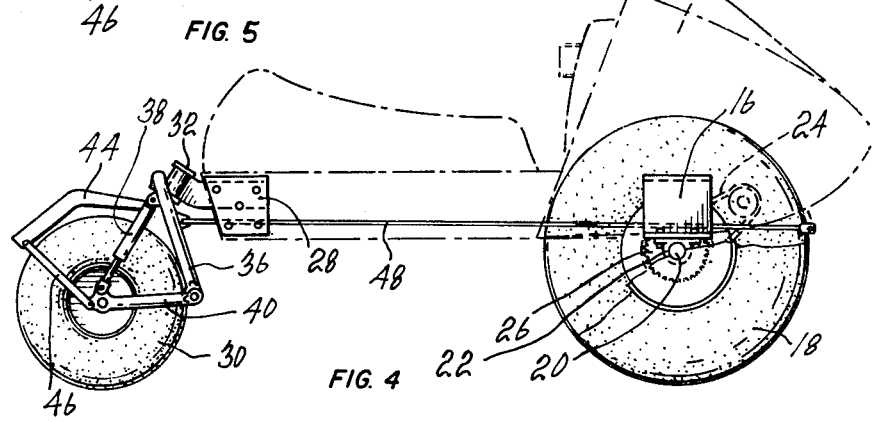
FIG. 4 is a side elevation view of the conversion device.

Referring to the drawings, there is shown an embodiment of a kit for converting a snowmobile 10 illustrated by dashed lines into a wheeled vehicle. The kit comprises a front wheel drive assembly designated generally by reference numeral 12 and a rear wheel steering assembly designated generally by reference numeral 14.

The front wheel drive assembly comprises a frame 16 which is adapted to be secured to the front end of the chassis of the snowmobile. Two large roller tires 18 coupled to an axle 20 are rotatably mounted in bearings 22 secured to frame 16. The axle is driven by the regular snowmobile engine through a chain 24 and a gear 26 mounted on the axle.

The rear wheel steering assembly comprises a frame 28 adapted to be secured to the rear end of the chassis of the snowmobile, a suspension mechanism for a single wheel 30 and a steering arrangement for the single rear wheel. The wheel suspension mechanism comprises a steering shaft 32 which is pivotally mounted on an extension 34 of the frame 28, a U-shaped member 36 having its central portion secured to the shaft 32 and its two legs extending downwardly one on each side of the wheel 30 and each forming one of the sloping legs of a pair of A-shaped suspension mechanisms located one on each side of the wheel. Each A-shaped wheel suspension mechanism is further defined by a spring biased shock absorber type suspension device 38 extending downwardly from the central portion of the U-shaped member 36 and forming the other sloping leg of the A-shaped suspension mechanism, and a transverse member 40 having one end pivotally connected to the end of a leg of U-shaped member 36 through shaft 42 and its other end connected to the lower end of suspension device 38. The axle of wheel 30 is pivotally mounted to the end of transverse member 40 which is connected to the lower end of suspension device 38. A mud guard 44 is positioned above the rear wheel and pivoted at one end between the legs of the U-shaped member 36 and at its other end to two links 46 which are themselves pivoted to the ends of transverse members 40 which support the axle of the wheel. The steering device comprises a steering rod 48 interconnecting each leg of the U-shaped member 36 to the arm 50 of the regular steering mechanism of the snowmobile.

The above conversion kit may be installed very easily by removing the skis and the track of the snowmobile and securing the frames 16 and 28 within the inverted U-shaped chassis of the snowmobile. In operation, the snowmobile engine will drive the front wheels and the handles of the snowmobile will operate the steering rods 48 and pivot the single rear wheel to steer the vehicle. It will be noted that the axis of the shaft 32 is inclined with respect to the vertical in the vertical plane of the vehicle in order to allow slight slanting of the rear wheel upon rotation to help steering.

Although the invention has been disclosed with reference to a preferred embodiment, it is to be understood that it is not limited to such embodiment but by the scope of the claims only. Indeed, modifications can be made to the front wheel drive assembly and to the rear wheel steering assembly which will still make the above assemblies work according to the spirit of the present invention. For example, the suspension mechanism disclosed for the rear wheel could be modified, in fact, be eliminated altogether if not necessary.

What I claim is:

1. A wheel conversion device for snowmobiles having a chassis supported by an endless track and a pair of front skis, and adapted to replace the endless track and the front skis, comprising:
   (a) a front wheel drive assembly including a frame adapted to be secured to the front end of the snowmobile chassis and a pair of laterally spaced wheels rotatably mounted on said frame and powered by the snowmobile engine; and
   (b) a rear wheel steering assembly including a rear frame adapted to be secured to the rear end of the said chassis, a single wheel pivotally mounted on the rear frame and steering means interconnecting the rear wheel to the regular steering mechanism of the snowmobile, said rear wheel steering assembly further comprising a steering shaft rotatably mounted on the rear frame, an inverted U-shaped frame having its central portion secured to said steering shaft and its legs extending one on each side of the wheel and each forming one sloping leg of an A-shaped suspension mechanism which further comprises a spring-biased suspension device extending downwardly from the central portion of said inverted U-shaped frame and forming the other sloping leg of said A-shaped suspension mechanism and a transverse member pivotally connecting the end of each leg of said inverted U-shaped frame to the lower end of said spring-biased suspension device, the axle of the rear wheel being pivotally mounted on the transverse member at the intersection of said transverse member with the lower end of the suspension device.

2. A wheel conversion device as defined in claim 1, wherein said front wheel drive assembly further comprises a pair of bearings secured to said frame, a drive shaft coupled to said wheels and journalled in said bearings, and drive means connecting said shaft to the snowmobile engine.

3. A wheel conversion device as defined in claim 1, further comprising a mud guard extending over the rear wheel and having one end pivotally mounted on the legs of said U-shaped frame, and a link connecting the other end of said mud guard to the end of the transverse member supporting the axle of said rear wheel.

* * * * *